(12) United States Patent
Perigo et al.

(10) Patent No.: US 10,937,572 B2
(45) Date of Patent: Mar. 2, 2021

(54) APPARATUS AND METHOD FOR FORMING AN ARTICLE

(71) Applicant: ABB Power Grids Switzerland AG, Baden (CH)

(72) Inventors: Elio Alberto Perigo, Raleigh, NC (US); Kathryn F. Murphy, South San Francisco, CA (US); Cherif Ghoul, Raleigh, NC (US); Jonah Kadoko, Mint Hill, NC (US); Matthew Hetrich, Raleigh, NC (US); Nikolaus Zant, Raleigh, NC (US); Krzysztof Kasza, Cracow (PL); Lukasz Matysiak, Cracow (PL); Robert Sekula, Cracow (PL); Lukasz Malinowski, Cracow (PL); Jens Rocks, Freinback (CH)

(73) Assignee: ABB Power Grids Switzerland AG, Baden (CH)

( * ) Notice: Subject to any disclaimer, the term of this patent is extended or adjusted under 35 U.S.C. 154(b) by 238 days.

(21) Appl. No.: 15/946,999

(22) Filed: Apr. 6, 2018

(65) Prior Publication Data

US 2019/0311822 A1    Oct. 10, 2019

(51) Int. Cl.
*B29C 64/241* (2017.01)
*H01B 17/28* (2006.01)
(Continued)

(52) U.S. Cl.
CPC ........... *H01B 17/28* (2013.01); *B29C 64/124* (2017.08); *B29C 64/218* (2017.08);
(Continued)

(58) Field of Classification Search
CPC ....... H01B 17/583; B33Y 10/00; B33Y 30/00; B33Y 50/00; B33Y 80/00
See application file for complete search history.

(56) References Cited

U.S. PATENT DOCUMENTS

| 5,348,986 A | 9/1994 | Chu et al. |
| 5,709,967 A | 6/1998 | Larsen |

(Continued)

OTHER PUBLICATIONS

H. K. Moffatt, Behaviour of a Viscous Film on the Outer Surface of a Rotating Cylinder, Journal de Mecanique, vol. 16, No. 5, 1977 (23 pages).

(Continued)

*Primary Examiner* — Austin Murata
(74) *Attorney, Agent, or Firm* — Sage Patent Group

(57) ABSTRACT

A method for forming an article of manufacture using additive manufacturing, includes: a processor executing program instructions to: (a) rotate an object continuously about a horizontal axis using a first rotational stage, wherein the object is partially submerged in a bath of energy curable liquid formulation during the rotation; (b) control a rate of rotation of the object to achieve a desired radial thickness of a sub layer of uncured liquid formulation at a desired rotational location on the object; (c) direct an energy source to provide an energy dose onto the object at a desired rotational location, wherein the energy dose is configured to cure and solidify the sub layer; and repeat (a), (b) and (c) until a desired radial thickness of a cured liquid formulation layer is a achieved.

30 Claims, 8 Drawing Sheets

(51) Int. Cl.
    *B29C 64/124*     (2017.01)
    *B29C 64/218*     (2017.01)
    *B29C 64/393*     (2017.01)
    *B33Y 30/00*     (2015.01)
    *B33Y 50/02*     (2015.01)
    *B33Y 80/00*     (2015.01)
    *B29L 31/34*     (2006.01)
    *B33Y 10/00*     (2015.01)

(52) U.S. Cl.
    CPC .......... *B29C 64/241* (2017.08); *B29C 64/393* (2017.08); *B29K 2995/0005* (2013.01); *B29K 2995/0007* (2013.01); *B29L 2031/3412* (2013.01); *B33Y 10/00* (2014.12); *B33Y 30/00* (2014.12); *B33Y 50/02* (2014.12); *B33Y 80/00* (2014.12)

(56) References Cited

U.S. PATENT DOCUMENTS

| | | | |
|---|---|---|---|
| 5,904,889 | A | 5/1999 | Serbin et al. |
| 9,002,496 | B2 | 4/2015 | Elsey |
| 9,527,272 | B2 | 12/2016 | Steele |
| 2008/0300337 | A1 | 12/2008 | Weine |
| 2009/0207205 | A1 | 8/2009 | Koike et al. |
| 2012/0235526 | A1* | 9/2012 | Wu .................. H02K 5/1675 |
| | | | 310/90 |
| 2014/0191439 | A1 | 7/2014 | Davis |
| 2014/0265034 | A1 | 9/2014 | Dudley |
| 2015/0031798 | A1 | 1/2015 | Rocks et al. |
| 2016/0366050 | A1 | 12/2016 | Morris et al. |
| 2017/0100898 | A1* | 4/2017 | Cofler .................. B29C 64/176 |
| 2018/0104806 | A1* | 4/2018 | Moore .................... B25D 9/04 |
| 2018/0370149 | A1* | 12/2018 | Ishibe .................... B33Y 30/00 |
| 2019/0336749 | A1* | 11/2019 | Daglow ............... B29C 64/106 |

OTHER PUBLICATIONS

P. L. Evans, L. W. Schwartz and R. V. Roy, Steady and Unsteady Solutions for Coating Flow on a Rotating Horizontal Cylinder: Two-Dimensional Theoretical and Numerical Modeling, Physics of Fluids 16, 2742 (2004); doi: 10.10631/1.1758943 (16 pages).

International Search Report and Written Opinion issued in corresponding international application No. PCT/US2019/025110, dated Jun. 11, 2019, 8 pp.

* cited by examiner

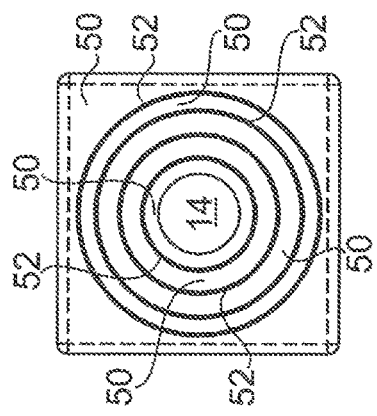
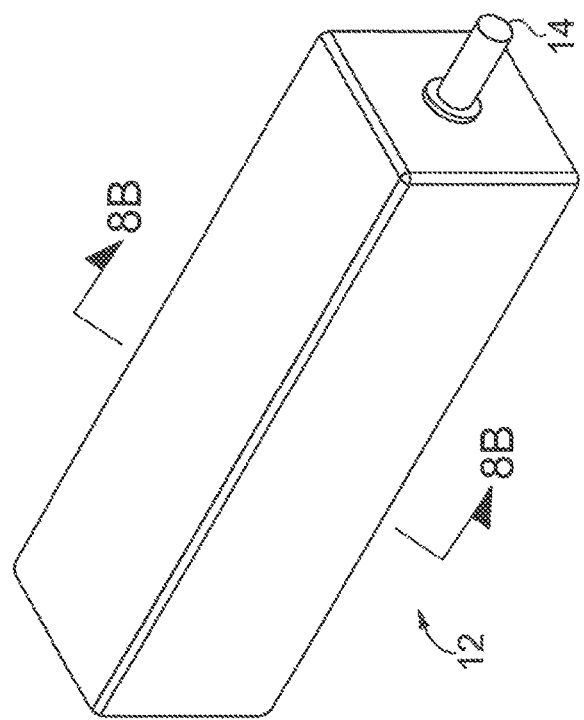
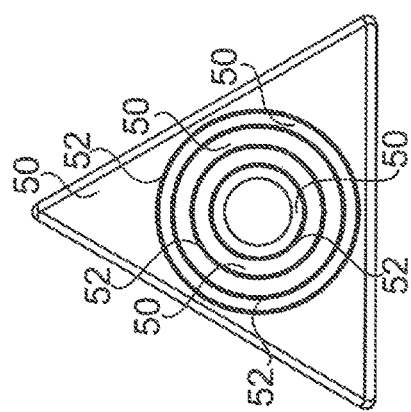
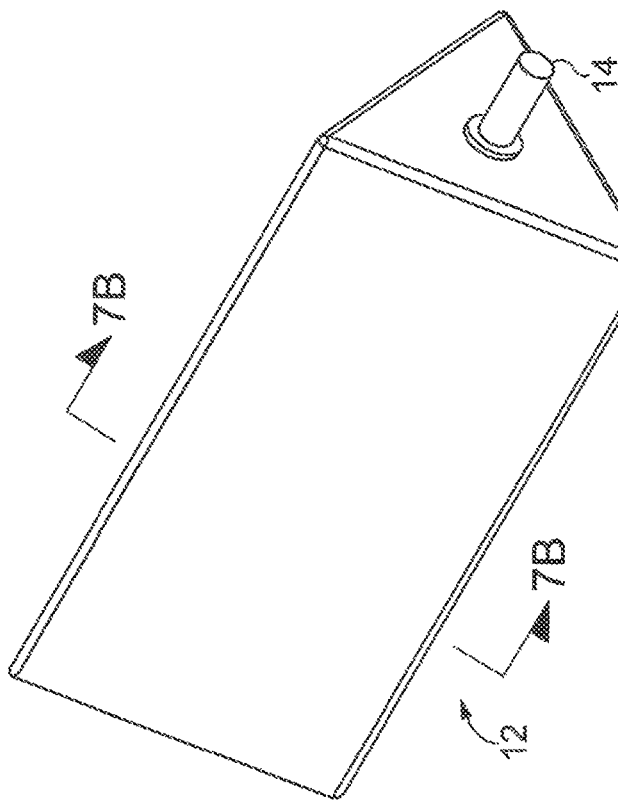

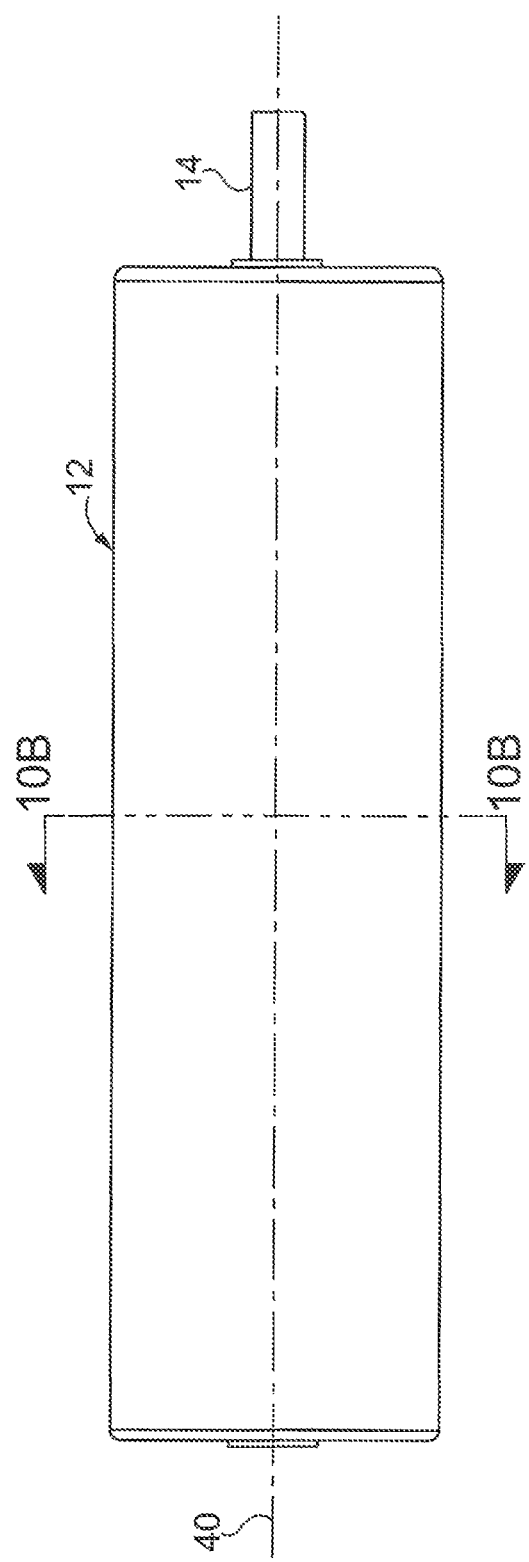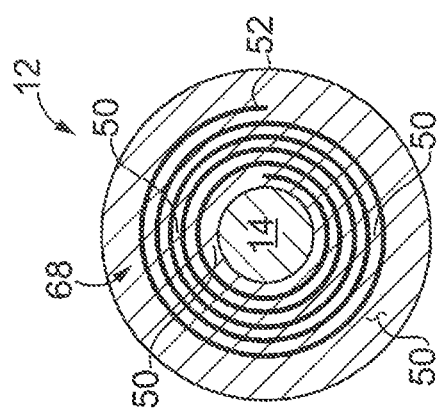

APPARATUS AND METHOD FOR FORMING AN ARTICLE

TECHNICAL FIELD

The present application generally relates to forming articles using additive manufacturing and more particularly, but not exclusively, to forming articles such as, e.g., condenser bushings, bulk-type bushings or other articles, using an additive manufacturing process.

BACKGROUND

Condenser bushings, e.g., for transformers and other devices, remain an area of interest. Some existing systems have various shortcomings, drawbacks and disadvantages relative to certain applications. For example, in some condenser bushing configurations, the manufacturing of the condenser bushing may be performed in shorter time periods. Accordingly, there remains a need for further contributions in this area of technology.

SUMMARY

One embodiment of the present invention is a unique method for forming an article of manufacturing using additive manufacturing. Another embodiment is a method for forming a condenser or bulk-type bushing using additive manufacturing. Another embodiment is a unique apparatus. Other embodiments include apparatuses, systems, devices, hardware, methods, and combinations for articles of manufacture, including condenser bushings and bulk-type bushings. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIGS. 7A and 7B schematically illustrate some aspects of a non-limiting example of an article formed using an additive manufacturing process, wherein the shape of the article is not a body of revolution, in accordance with an embodiment of the present invention.

FIGS. 8A and 8B schematically illustrate some aspects of a non-limiting example of an article formed using an additive manufacturing process, wherein the shape of the article is not a body of revolution, in accordance with an embodiment of the present invention.

FIGS. 10A and 10B schematically illustrate some aspects of a non-limiting example of an article formed using an additive manufacturing process, wherein a single continuous conductive layer in the form of a spiral is employed in accordance with an embodiment of the present invention.

DETAILED DESCRIPTION OF THE ILLUSTRATIVE EMBODIMENTS

Figure 1:
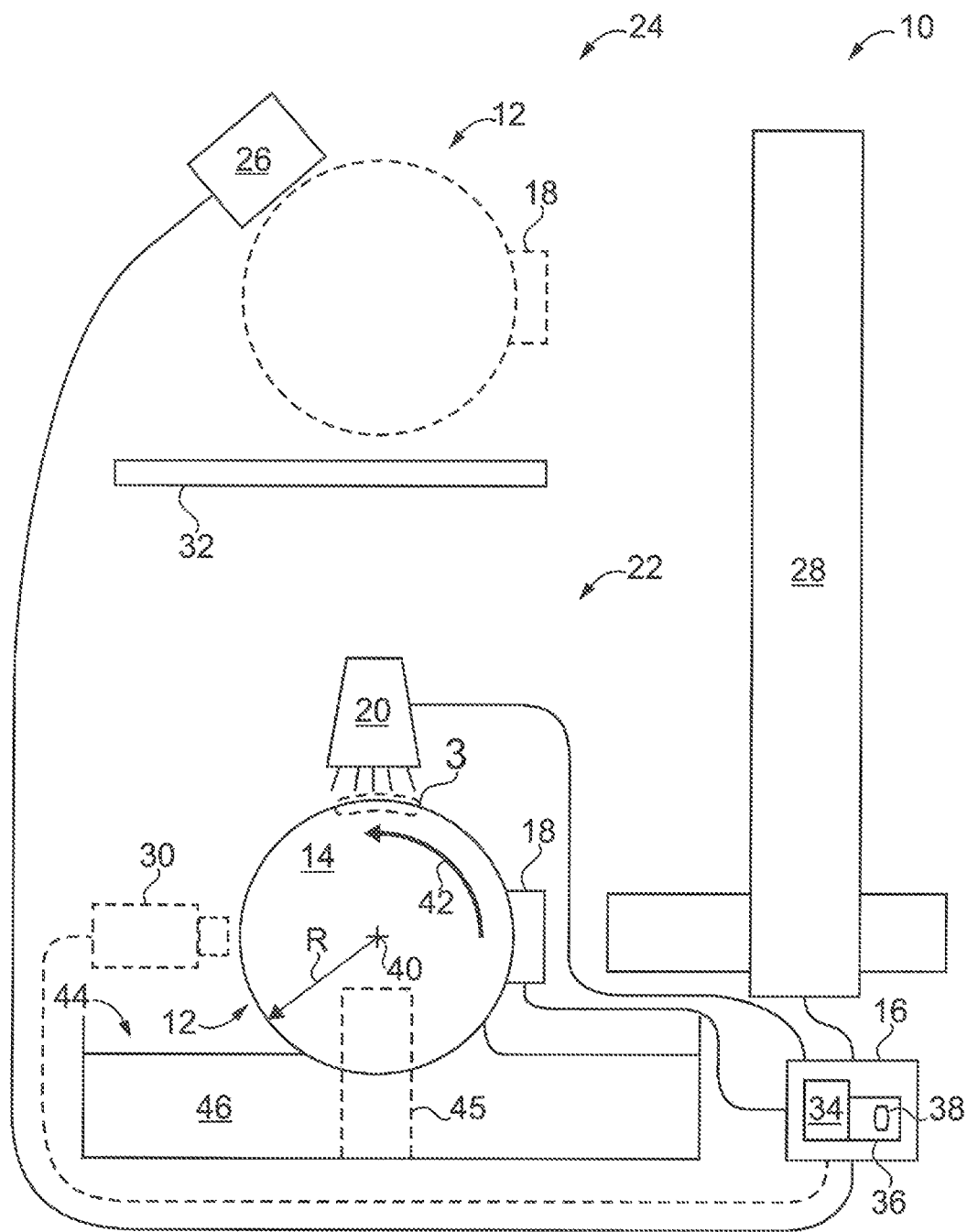
FIG. 1 schematically illustrates some aspects of a non-limiting example of a system for manufacturing an article, such as a condenser bushing, using an additive manufacturing process in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a system 10 for manufacturing an object, e.g., an article 12, such as a condenser bushing, using an additive manufacturing process are schematically illustrated in accordance with an embodiment of the present invention. In the form of a condenser bushing, article 12 may be, for example, a transformer bushing or another type of condenser bushing or bulk-type bushing having a cylindrical conductor 14 at its core. In other embodiments, conductor 14 may not be cylindrical, but rather, other shapes may be employed. For example, in other embodiments conductor 14 have a hexagonal and/or other cross-sectional shape(s) in place of the circular cross-sectional shape of a cylinder. In various embodiments, conductor 14 may be solid or may be hollow or may be solid in some portions and hollow in other portions. Article 12 may be constructed for use or as part of an electrical system, such as a low, medium or high voltage electrical system or electrical distribution system, e.g., for use in or with a transformer, switchgear and/or other electrical system components. In other embodiments, article 12 may be another type of article of manufacture, e.g., other than a condenser bushing. System 10 includes a controller 16, a rotational stage 18, and an energy source 20 disposed at a first production station 22. Energy source 20 may be used for curing a photocurable polymer, monomer, oligomer and/or other liquid formulation, and/or may be used for melting, and/or may be used for providing a reaction trigger, and/or may be used for other purposes.

Some embodiments include a second production station 24 having a material application system 26. Such embodiments may include a transfer mechanism 28 constructed to move the article 12 being formed (and in some embodiments, rotational stage 18) between first production station 22 and second production station 24 during the manufacturing of article 12, e.g., so that production operations may be alternatingly performed by first production station 22 and second production station 24. In some embodiments, transfer mechanism 28 may also be constructed to move the article 12 being formed (and in some embodiments, rotational stage 18) to other production stations for the performance of other manufacturing operations, e.g., cleaning, drying and/or other operations. Other embodiments may alternatively include a material application system 30 at production stage 22, e.g., in place of material application system 26. In embodiments where second production station 24 is located above first production station 22, shielding 32 may be positioned to avoid contamination of first production station 22.

Controller 16 includes a processor 34 coupled to a memory device 36, such as a non-transitory computer readable storage medium readable by a processor and storing program instructions 38 for execution by the processor 34. In some embodiments, memory device 36 may obtain program instructions 38 from another non-transitory computer readable storage medium readable by a processor and storing program instructions 38 for execution by a processor, e.g., via downloading by wired or wireless or optical connection.

Controller 16 is communicatively coupled to rotational stage 18, energy source 20, material application system 26, transfer mechanism 28, and in embodiments so equipped, material applications system 30. During the production of article 12, controller 16, e.g., processor 34, executes program instructions 38 to perform the various acts described herein.

Figure 2:
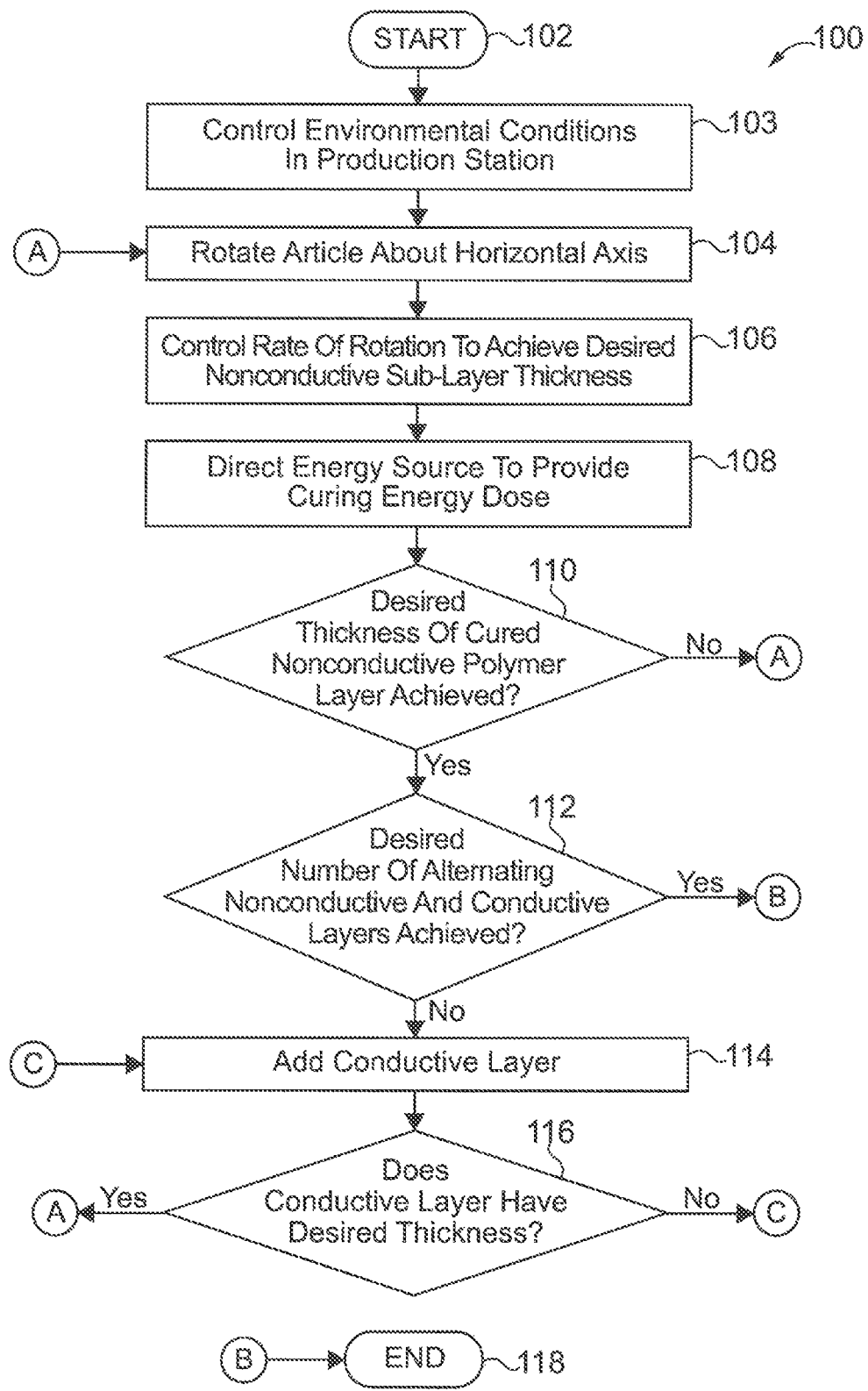
FIG. 2 is a flowchart depicting some aspects of a non-limiting example of a method for forming an article of manufacture, e.g., a condenser bushing, using additive manufacturing in accordance with an embodiment of the present invention.

Referring also to FIG. 2, a flowchart 100 depicting some aspects of a non-limiting example of a method for forming an article 12 of manufacture, e.g., a condenser bushing, using additive manufacturing is illustrated in accordance with an embodiment of the present invention. Process flow begins at block 102.

At the start of manufacturing article 12, a mandrel, e.g., conductor 14, which may or may not be cylindrical, is mounted on rotational stage 18. Rotational stage 18 is operative to rotate the mandrel and the article 12 being formed about a horizontal axis of rotation 40, which extends perpendicular to the plane of view of FIG. 1.

At block 103, environmental conditions in production station 22, and in some embodiments, production station 24, are controlled to achieve desired levels and are stabilized at the desired levels, e.g., within a desired tolerance band, for example, to maintain desired properties of formulation 46 for the formation of nonconductive layers 50 and/or to maintain desired properties of the conductive material for the formation of conductive layers 52 (formulation 46, nonconductive layers 50 and conductive layers 52 are described below). For example, in some embodiments, the ambient gas composition, humidity, temperature and pressure are controlled to achieve desired levels and stabilized at the desired levels in production station 22, and in some embodiments, in production station 24. The levels in production station 24 may or may not be the same as in production station 22. The ambient humidity, temperature and pressure may be controlled and stabilized by, for example, equipment such as humidifiers, heaters and chillers. The ambient gas composition may be controlled and stabilized by use of, among other things, for example, bottled gas, gas separation modules, vents, filters, atmospheric recyclers and/or other means to maintain a desired gas composition in production station 22, and in some embodiments, production station 24. In some embodiments, the environmental conditions may be controlled (and stabilized) by processor 34. In other embodiments, the environmental conditions may be controlled (and stabilized) by one or more other processors or controllers, with or without human intervention, or may be controlled (and stabilized) by human input.

At block 104, processor 34 executes program instructions 38 to rotate the article 12 being formed about horizontal axis 40. In the view of FIG. 1, the rotation is in a counterclockwise direction 42. In one form, the rotation is continuous at a constant angular speed or velocity. In other embodiments, the rotation may be intermittent and/or may have a changing angular speed or velocity. During the rotation, article 12 being formed is partially submerged or immersed in a bath 44 of a liquid formulation 46. Liquid formulation 46 may be a polymer, a monomer and/or an oligomer, or a liquid formulation containing a polymer, monomer, oligomer or a combination thereof. In various embodiments, liquid formulation 46 may include a photoinitiator. Liquid formulation 46 may be cured into a solid condition by application of the appropriate type and amount of energy, e.g., photonic energy. For example, in some embodiments, liquid formulation 46 is photocurable, i.e., is subject to photoinduced hardening using a particular wavelength/frequency of electromagnetic radiation or light. Thus, a cured liquid formulation 46 is a solid. In one form, liquid formulation 46 is electrically nonconductive, i.e., is insulating. In other embodiments, liquid formulation 46 may be electrically conductive.

In the form of a photocurable liquid formulation, liquid formulation 46 may be cured by, for example, an energy dose of ultraviolet light in some embodiments, or blue light in other embodiments or light of one or more other frequencies in other embodiments. In some embodiments, liquid formulation 46 may be curable by an energy dose of infrared radiation or infrared light. In some embodiments, the liquid formulation 46 may contain solid particles or additives such as $SiO_2$ and/or $Al_2O_3$ and/or one or more other materials.

In some embodiments, a linear stage 45 may be used to maintain a desired degree of immersion of the article 12 being formed in bath 44. In other embodiments, the bath 44 level of liquid formulation 46 may be maintained by means not shown, e.g., a float valve and a pump.

The rotation of the article 12 being formed in bath 44 entrains a quantity of the liquid formulation 46 onto article 12. The liquid formulation achieves a mean film thickness (radial thickness), H, along the article 12 being formed, and is cured by energy source 20 delivering a curing energy dose to the liquid formulation 46. As mentioned above, the energy dose delivered by energy source 20 may be electromagnetic radiation, which may be of one or more specific wavelengths, a range of wavelengths or a combination of discrete wavelengths and ranges of wavelengths. Non-limiting examples include an energy dose of ultraviolet light in some embodiments, or blue light in other embodiments or light of one or more other frequencies in other embodiments. In still other embodiments, liquid formulation 46 may be curable by an energy dose of infrared radiation or infrared light.

Figure 3:
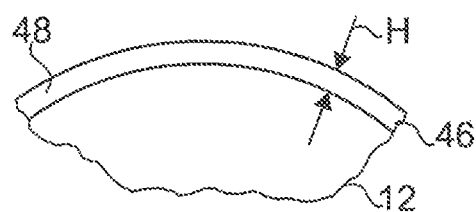
FIG. 3 schematically illustrates some aspects of an expanded view of an article being formed, depicting a sub layer of a nonconductive liquid formulation being cured in accordance with an embodiment of the present invention.

Referring also to FIG. 3, film or sub layer thickness H of liquid formulation 46 is depicted. The film or sub layer thickness H, i.e., the radial thickness, varies with the radius R of the article 12 being formed, the speed of rotation of the article 12 being formed (i.e., the angular velocity), and the density and viscosity of liquid formulation 46. For example, Equation 1, below may be used to approximate the radial thickness H:

$$H = \frac{4.428}{2\pi} \sqrt{\frac{\mu \cdot \Omega \cdot R}{\rho \cdot g}}$$ Equation 1 where $\mu$ is liquid viscosity of the liquid formulation 46, $\Omega$ is the rotational or angular speed of article 12, $\rho$ is liquid density of the liquid formulation 46, g is gravitational acceleration, R is the radius of the article 12 being formed, and H is the coating mean thickness (radial thickness) for the liquid formulation 46 on the outside of the article 12 being formed. Once a reasonable approximation of a desired radial thickness H is reached, rotational speed or angular velocity may be adjusted to fine-tune the radial thickness to achieve a desired radial thickness H. Thus, in some embodiments, system 10 applies liquid formulation 46 and achieves a desired radial thickness H of formulation 46 prior to curing, but without the use of scraper blades, rollers or other mechanical means to achieve the desired radial thickness H for curing. In other embodiments, other approaches may be employed to obtain a desired radial thickness H may be utilized. In some embodiments, scraper blades or rollers or other features or means may be employed to obtain a desired radial thickness H. In other embodiments, the liquid formulation 46 may be applied, for example, by painting it on the article 12 being formed, by brushing, spray coating or dripping liquid formulation 46 onto the article 12 being formed, with or without the use of scraper blades, rollers or other means to obtain the desired radial thickness H.

At block 106, processor 34 executes program instructions 38 to control a rate of rotation of the article 12 being formed to achieve a desired radial thickness H of a sub layer of uncured liquid formulation 46 at a desired rotational location on the object, e.g., based on Equation 1 and calibrations of angular velocity and radial thickness H. The controlled rate of rotation may include adjustments to account for the increasing radius of the article 12 being formed as nonconductive (insulating) and conductive layers are added to the article 12 being formed, e.g., via additive manufacturing. In some embodiments, e.g., in some bulk-type bushings, only nonconductive layers may be applied.

At block 108, processor 34 executes program instructions 38 to direct energy source 20 to provide a curing energy dose onto the object at a desired rotational location, e.g., where the radial thickness H of the liquid formulation 46 is at a desired value. A curing energy dose is an energy dose configured and sufficient to cure and solidify a sub layer of desired radial thickness H, e.g., sub layer 48. The radial thickness of any given sub layer of liquid formulation 46 may be, for example, in the range of 0.02 mm to 3.0 mm. That is, a film or liquid sub layer having a radial thickness in the range of 0.02 mm to 3.0 mm may be cured into a solid sub layer 48 of liquid formulation 46. In other embodiments, the film and sub layer radial thickness may be outside this range. In one form, energy source 20 is or includes a digital light processor. In other embodiments, energy source 20 may be any light/energy source capable of delivering radiant energy to cure the desired radial thickness H of liquid formulation 46, for example, one or more banks or arrays of light emitting diodes (LEDs), one or more lasers, such as line lasers and/or other lasers, and/or lamps, and/or one or more other suitable radiant light/energy sources. In some embodiments, the radiant energy produced by energy source 20 is transformed, enhanced and/or controlled by routing it through a mask, digital micro-mirror devices (DMDs), optical filters and/or lenses to produce the desired geometry of nonconductive sub layers 48 and nonconductive layers 50 (layers 50 of liquid formulation 46 are described below), and ultimately of the formed article 12. Energy source 20 may be constructed to provide the radiant energy in terms of ultraviolet light in some embodiments, or blue light in other embodiments or light of one or more other frequencies in other embodiments. In still other embodiments, infrared radiation or infrared light may be used.

Figure 9A:
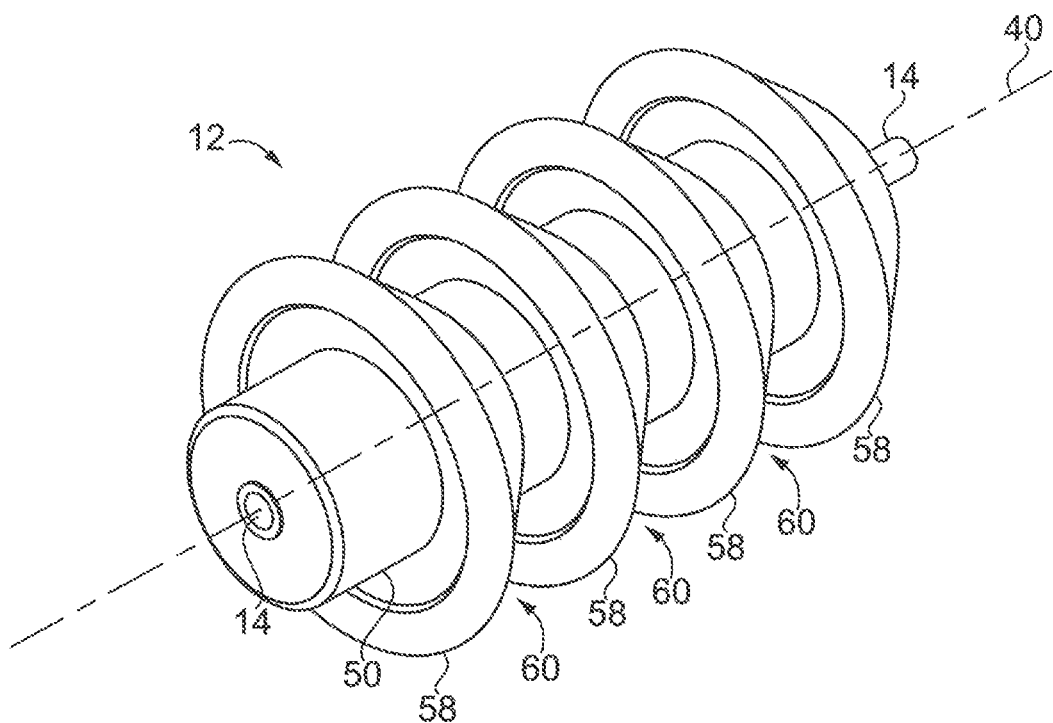
FIG. 9A-9C schematically illustrate some aspects of a non-limiting example of an article formed using an additive manufacturing process, wherein cured nonconductive segments are separated from each other by an air gap in accordance with an embodiment of the present invention.
Figure 9B:
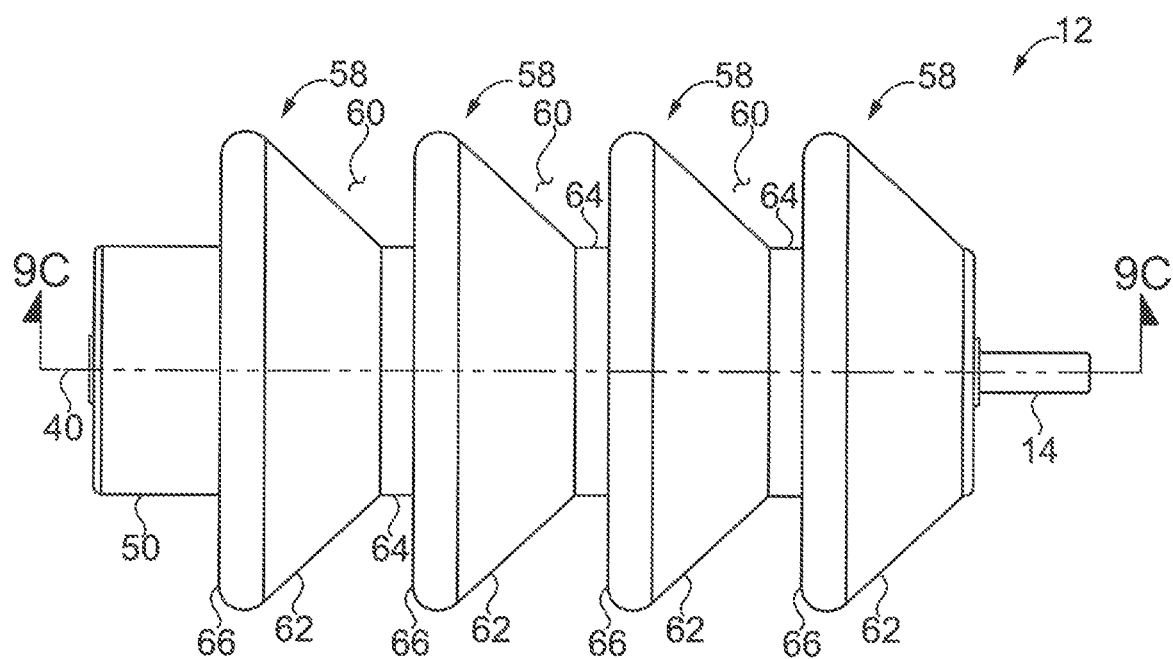
Figure 9C:
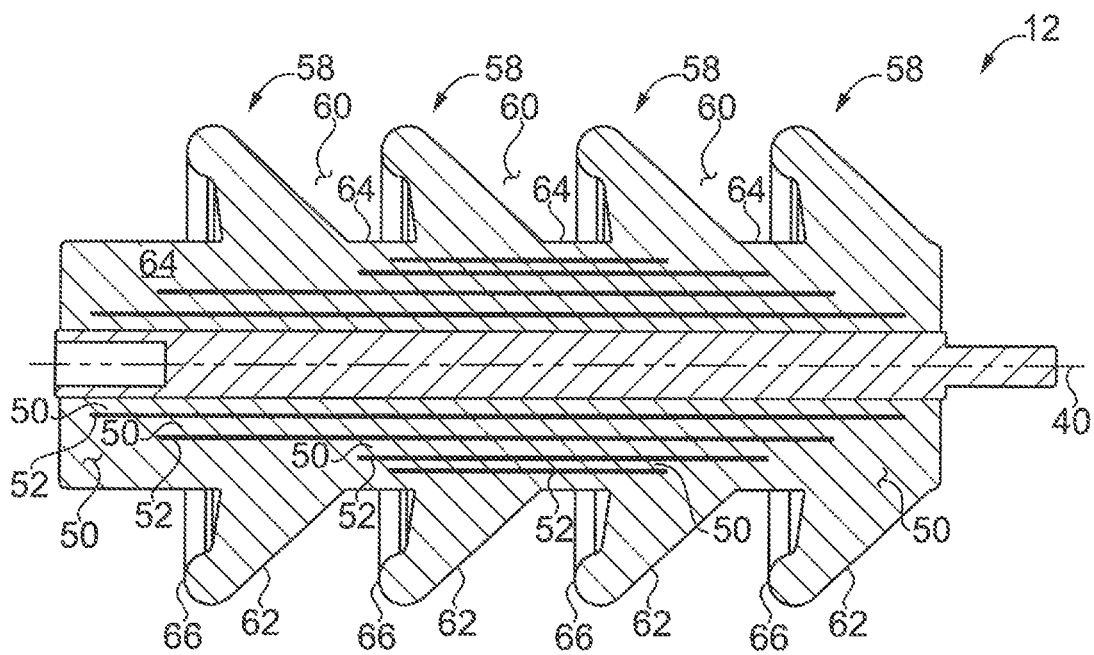

In some embodiments, processor 34 executes program instructions directing energy source 20 to vary its output along the horizontal axis of rotation 40. For example, energy source 20 may vary a length along the horizontal axis to which the energy dose is applied. Accordingly, the length of one cured liquid formulation 46 sub layer 48 or layer 50 along the horizontal axis of rotation 40 may be different than the length of another cured sub layer 48 or layer 50 along the horizontal axis of rotation 40. Also, in some embodiments, processor 34 executes program instructions directing energy source 20 to cure only desired segments along horizontal axis of rotation 40, e.g., such that cured segments along horizontal axis of rotation 40 may be generated and spaced apart along horizontal axis of rotation 40 by uncured segments, resulting in an article 12 having cured nonconductive segments separated from each other by an air gaps, and having overhung portions (e.g., as illustrated in FIGS. 9A-9C). The size or length along horizontal axis of rotation 40 of the cured and uncured segments may vary with the needs of the particular application. In addition, in some embodiments, processor 34 executes program instructions to selectively control the output of energy source 20, e.g., controlling when it is turned on and when it is turned off or modulating its output, e.g., in the form of pulse width modulation, to achieve a shape of article 12 that is not a body of revolution, e.g., as illustrated in FIGS. 7A, 7B, 8A and 8B.

Figure 4:
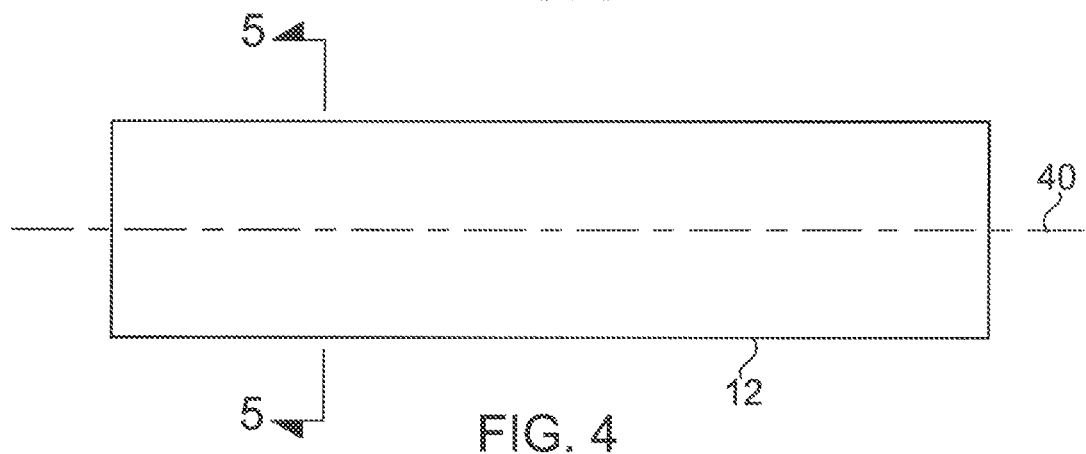
FIG. 4 schematically illustrates some aspects of non-limiting example of an article formed using an additive manufacturing process in accordance with an embodiment of the present invention.
Figure 5:
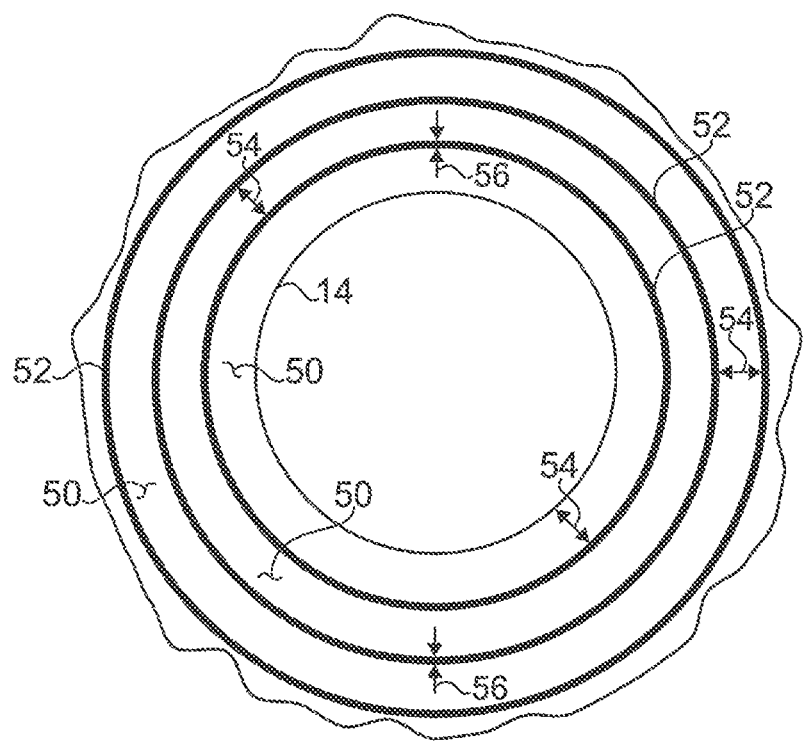
FIG. 5 schematically illustrates some aspects of a non-limiting example of a section view of the article of FIG. 4 in accordance with an embodiment of the present invention.

Referring also to FIGS. 4 and 5, at block 110, processor 34 executes program instructions 38 to determine whether a desired radial thickness 54 of a cured nonconductive liquid formulation 46 layer 50 has been achieved. For example, the radial thickness of nonconductive layer 50, and/or of one or more nonconductive sub layers 48 in some embodiments, can be determined by image analysis (e.g. via 2D and/or 3D image and/or video processing), mechanical and/or optical physical measurements. In some embodiments, the number of sub layers 48 of a layer 50 may be multiplied by the thickness of each sub layer 48 in order to determine whether the desired radial thickness 54 of the layer 50 has been achieved. If not process flow returns to block 104, and repeats the processes of blocks 104-108, building one or more sub layers 48 upon the initial sub layer 48 until a desired radial thickness of the cured formulation 46 layer 50 has been achieved. If so, process flow proceeds to block 112. It will be understood that in some embodiments, a cured nonconductive layer 50 of liquid formulation 46 may be formed of a single sub layer 48 of cured nonconductive liquid formulation 46, whereas in other embodiments, a plurality of sub layers 48 of cured nonconductive liquid formulation 46 may be built up to achieve a single layer 50 of cured nonconductive liquid formulation 46. In some embodiments, a "layer" of cured nonconductive liquid formulation 46 defines the separation distance between conductive layers 52 or between a conductive layer 52 and conductor 14. Thus, in some embodiments, the radial distance between conductive layers 52 defines the radial thickness 54 of a layer 50, with the exception of the outermost nonconductive layer, which may have any desired radial thickness.

At block 112, processor 34 executes program instructions to determine whether the desired number of alternating nonconductive and conductive layers has been achieved. If so, process flow proceeds to block 118, and the process ends. If not, process flow proceeds to block 114.

At block 114, processor 34 executes program instructions to form or add a conductive layer 52, e.g., over all or part of the currently outermost nonconductive layer 50. In some embodiments, processor 34 also executes program instructions to vary the length of conductive layer 52 along horizontal axis of rotation 40, wherein the length of conductive layers 52 may be different, i.e., so that some conductive layers 52 are longer and/or shorter than others, e.g., to provide an electric field gradient to an article 12 in the form of a condenser bushing. In some embodiments, processor 34 executes program instructions to direct transfer mechanism 28 to remove the article 12 being formed (and in some embodiments, rotational stage 18) from bath 44 and first production station 22 after achieving a desired nonconductive layer radial thickness, and deliver it to second production station 24 for the addition of a conductive layer by material application system 26. Material application system 26 is constructed to deposit a conductive layer onto the cured nonconductive layer. In some embodiments, the article 12 being formed may be cleaned prior or subject to another procedure prior to the application of conductive layer 52. In some embodiments, the volume of the article 12 being immersed in bath 44 may be modified, e.g., so that the entire article 12 being formed may be cured prior to the application of conductor layer 52. Material application system 26 may include a linear stage in order to allow material application system 26 to maintain a desired distance from the article 12 being formed.

During the application of the conductive layer(s), the article 12 being formed is rotated about horizontal axis of rotation 40, and the conductive layer is applied over the cured nonconductive layer. In some embodiments, the conductive layer(s) may only be applied over part of the nonconductive layer. In one form, material application system 26 is a roller to transfer conductive material to the article 12 being formed, i.e., transfer a conductive layer 52, in the form of a foil or paint, such as a carbon black paint. In other material application system 26 may be an inkjet engine operative to print the conductive layer onto the non-conductive layer (or onto a previous conductive layer). In some embodiments, material application system 26 may be an electro-deposition system constructed to deposit a conductive layer over a nonconductive layer or over a previous conductive layer. In various embodiments, the conductive layer 52 may also or alternatively be formed of a metallic paint, a metallic liquid, an epoxy and/or formulation 46. For example, the metallic paint, metallic liquid, epoxy and/or formulation 46 may include or be formed partially of a conductive material, such as silver, carbon, carbon black, zinc, nickel, aluminum and/or copper, for example, or may have such materials distributed throughout the base of such paint, liquid, epoxy and/or formulation 46. The metallic paint and/or metallic liquid may be formed completely or substantially completely out of a conductive material, such as silver, carbon, carbon black, zinc, nickel, aluminum and/or copper, for example, or may have such materials distributed throughout the base of such metallic paint and/or metallic liquid. After a conductive layer has been added, process flow proceeds to block 116.

In other embodiments, conductive layer 52 may be added by material application system 30 in first production station 22, wherein the conductive layer is added rotationally downstream of the provision of the curing energy dose during continuous rotation by rotational stage 18. The description of material application system 26 and conductive layer 52 materials applies equally to material application system 30. Because material application system 30 applies conductive layer 52 to a cured portion of the article 12 being formed, in some embodiments, the article 12 being formed does not need to be removed from bath 44 during the application of conductive layer 52 by material application system 30. In other embodiments, linear stage 45 may be used to lift article 12 from bath 44 prior to or during the application of one or more conductive layers 52.

At block 116, processor 34 executes program instructions to determine whether conductive layer 52 has a desired radial thickness 56. For example, one or more measurements may be taken to determine if conductive layer 52 has the desired radial thickness. Examples of measurements may include the radial thickness of conductive layer 52 being determined by image analysis (e.g. via 2D and/or 3D image and/or video processing), and/or mechanical, optical and/or physical measurements. In some embodiments, e.g., where conductive layer 52 is built from a plurality of sub layers of the conductive material, the number of sub layers may be multiplied by the thickness of each sub layer in order to determine whether the desired radial thickness 56 of a conductive layer 52 of has been achieved. In another example, the program instructions might call for more than one conductive layer 52 to be added, and the determination may be or may include a determination as to whether the count of the desired number of conductive layers or sub layers has been reached. If not, process flow proceeds back to block 114 for the addition of another conductive layer 52. If so, process flow proceeds back to block 104. Blocks 104-116 are repeated until at block 112, processor 34 executes program instructions to determine whether the desired number of alternating nonconductive and conductive layers has been achieved, and the result of the determination is that the desired number of alternating nonconductive and conductive layers.

Figure 6A:
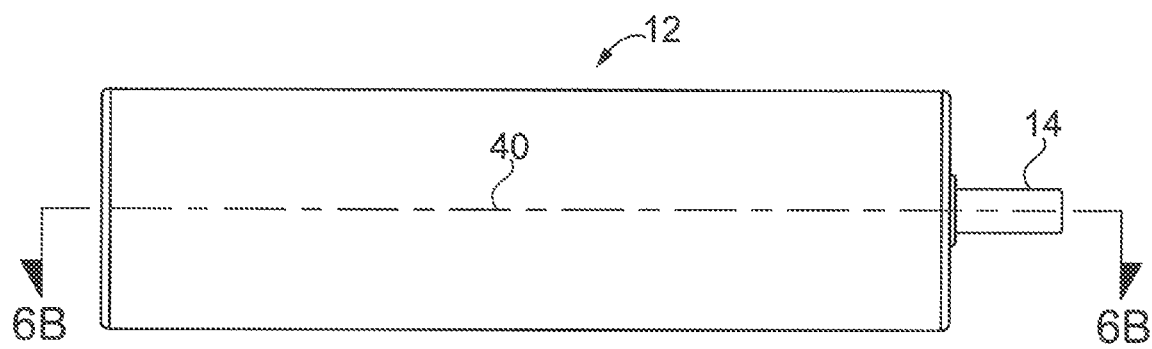
FIGS. 6A-6C schematically illustrate some aspects of a non-limiting example of an article formed using an additive manufacturing process wherein the length of the conductive layers along the axis of rotation varies, e.g., to provide electric field grading, in accordance with an embodiment of the present invention.
Figure 6B:
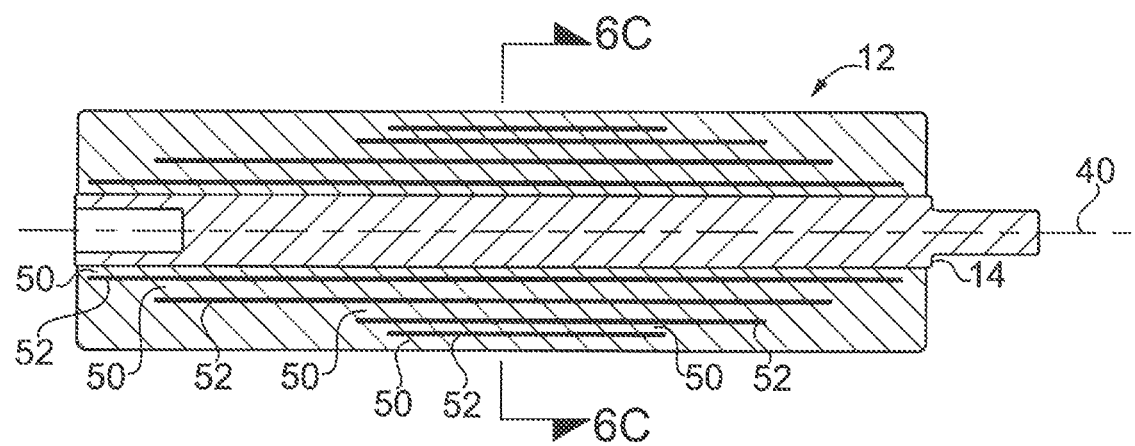
Figure 6C:
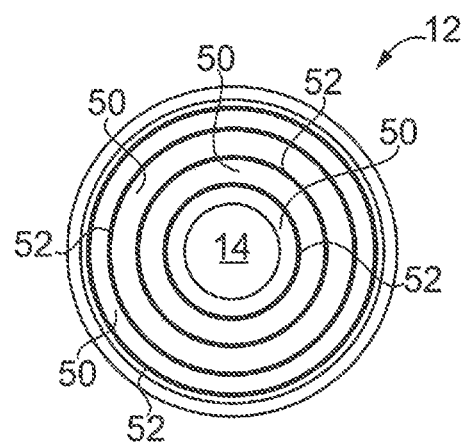

Referring also to FIGS. 6A-6C some aspects of a non-limiting example of an article 12 formed using an additive manufacturing process e.g., as described herein, are schematically illustrated, wherein the length of the conductive layers 52 along the axis of rotation varies, e.g., to provide electric field grading, in accordance with an embodiment of the present invention. FIG. 6B illustrates an example of the length of the conductive layers 52 along the horizontal axis 40 being varied, e.g., so that the radially innermost conductive layer has a greater length than each succeeding next outer conductive layer 52.

Referring also to FIGS. 7A and 7B some aspects of a non-limiting example of an article 12 formed using an additive manufacturing process e.g., as described herein, are schematically illustrated, wherein the shape of article 12 is not a body of revolution, in accordance with an embodiment of the present invention.

Referring also to FIGS. 8A and 8B some aspects of a non-limiting example of an article 12 formed using an additive manufacturing process e.g., as described herein, are schematically illustrated, wherein the shape of article 12 is not a body of revolution, in accordance with an embodiment of the present invention.

FIGS. 9A-9C schematically illustrate some aspects of a non-limiting example of an article 12 formed using an additive manufacturing process, e.g., as described herein, wherein cured nonconductive segments 58 are separated from each other by air gap 60 in accordance with an embodiment of the present invention. Nonconductive segments 58 include extensions 62 that extend from a main body 64 of article 12. Main body 64 of the illustrated embodiment is formed of alternating nonconductive layers 50 and conductive layers 52, with a nonconductive layer 50 disposed about the radially outermost conductive layer 52.

Nonconductive segments 58 and extensions 62 are integral with main body 64 and form a unitary structure with main body 64. In some embodiments, each extension 62 includes an overhang portion 66 that overhangs the balance of extensions 62. Overhang portions 66 are integral with extensions 62 and form a unitary structure therewith. Although supported tangentially or diagonally by the balance of extension 62, there is no direct radial support for each overhang portion 66, i.e., no structural support that is perpendicular to horizontal axis of rotation 40 and disposed between overhang portions 66 and main body 64. Rather, overhang portions 66 are cantilevered off extensions 62. Nonconductive segments 58 and extensions 62 with overhang portions 66 may form, for example, a weather shed (a bushing shed) for a condenser bushing in some embodiments, or for a bulk-type bushing in other embodiments.

Referring also to FIGS. 10A and 10B, some aspects of a non-limiting example of an article 12 formed using an additive manufacturing process, e.g., as described herein, are illustrated in a wherein accordance with an embodiment of the present invention. In the embodiment of FIGS. 10A and 10B, a single continuous conductive layer 52 is formed as a spiral 68. In other embodiments, spiral 68 may be discontinuous. For example, spiral 68 may be formed of a plurality of conductive layers 52 arranged as a discontinuous spiral, which may or may not include circumferential overlap of adjacent conductive layers 52, e.g., depending upon the embodiment.

Embodiments of the present invention include a method for forming an article of manufacture using additive manufacturing, comprising: (a) rotating an object continuously about a horizontal axis using a first rotational stage, wherein the object is partially submerged in a bath of energy curable liquid formulation during the rotation; (b) controlling a rate of rotation of the object to achieve a desired radial thickness of a sub layer of uncured liquid formulation at a desired rotational location on the object; (c) directing an energy source to provide an energy dose onto the object at a desired rotational location, wherein the energy dose is configured to cure and solidify the sub layer; and repeating (a), (b) and (c) until a desired radial thickness of a cured liquid formulation layer is a achieved.

In a refinement, the method further comprises forming the article as a bulk-type bushing.

In another refinement, the cured liquid formulation layer is a nonconductive layer, further comprising (d) forming a conductive layer over at least part of the nonconductive layer.

In yet another refinement, the method further comprises forming the article as a condenser bushing.

In still another refinement, the method further comprises a transfer mechanism removing the object from the bath after achieving the desired cured liquid formulation layer radial thickness; rotating the object about the horizontal axis; and applying the conductive layer over the at least part of the nonconductive layer.

In yet still another refinement, the conductive layer material is added rotationally downstream of the provision of the energy dose during continuous rotation by the first rotational stage.

In a further refinement, the method further comprises repeating (a), (b) and (c) until a desired radial thickness of a second nonconductive layer is achieved.

In a yet further refinement, the method further comprises repeating (d), (a), (b) and (c) until a desired number of alternating nonconductive and conductive layers have been achieved.

In a still further refinement, the method further comprises varying a length along the horizontal axis of selected conductive layers.

In a yet still further refinement, the method further comprises operating a linear stage to maintain a desired degree of submersion of the object in the bath.

In another further refinement, the method further comprises varying a length along the horizontal axis to which the energy dose is applied.

In yet another further refinement, the method further comprises varying an output of the energy source to achieve a shape of the article that is not a body of revolution.

In still another further refinement, the method further comprises forming an overhang on the article.

In yet still another further refinement, the method further comprises repeating (a), (b) and (c) to form a weather shed on the article.

Embodiments of the present invention include a method for forming a condenser bushing using additive manufacturing, comprising: (a) rotating an object about an axis of revolution using a first rotational stage, (b) applying a photocurable nonconductive liquid formulation sub layer to the object; (c) directing an energy source to provide an energy dose onto the object at a desired rotational location, wherein the energy dose is configured to cure and solidify the sub layer; repeating (a), (b) and (c) until a desired radial thickness of a cured liquid formulation layer is a achieved; (d) forming a conductive layer over at least part of the nonconductive layer; and repeating (a), (b), (c) and (d) until a desired number of alternating nonconductive and conductive layers have been achieved.

In a refinement, the method further comprises varying a length along the axis of rotation of selected conductive layers.

In another refinement, the method further comprises varying a length along the axis of rotation along which the energy dose is applied.

In yet another refinement, the method further comprises varying an output of the energy source to achieve a shape of the article that is not a body of revolution.

Embodiments of the present invention include an apparatus, comprising: a non-transitory computer readable storage medium readable by a processor and storing program instructions for execution by the processor to: (a) rotate an object continuously about a horizontal axis using a first rotational stage, wherein the object is partially submerged in a bath of energy curable liquid formulation during the rotation; (b) control a rate of rotation of the object to achieve a desired radial thickness of a sub layer of uncured liquid formulation at a desired rotational location on the object; (c) direct an energy source to provide an energy dose onto the object at a desired rotational location, wherein the energy dose is configured to cure and solidify the sub layer; and repeat (a), (b) and (c) until a desired radial thickness of a cured liquid formulation layer is a achieved.

In a refinement, the cured liquid formulation layer is a nonconductive layer, wherein the non-transitory computer readable storage medium readable by the processor further stores program instructions for execution by the processor to (d) add a conductive layer over at least part of the nonconductive layer.

In another refinement, the non-transitory computer readable storage medium readable by the processor further stores program instructions for execution by the processor to: direct a transfer mechanism to remove the object from the bath after achieving the desired cured liquid formulation layer radial thickness; rotate the object about the horizontal axis; and apply the conductive layer over the at least part of the nonconductive layer.

In a yet another refinement, the non-transitory computer readable storage medium readable by the processor further stores program instructions for execution by the processor to: add the conductive layer material rotationally downstream of the provision of the energy dose during continuous rotation by the first rotational stage.

In still another refinement, the non-transitory computer readable storage medium readable by the processor further stores program instructions for execution by the processor to: repeat (a), (b) and (c) until a desired radial thickness of a second nonconductive layer is achieved.

In yet still another refinement, the non-transitory computer readable storage medium readable by the processor further stores program instructions for execution by the processor to: repeat (d), (a), (b) and (c) until a desired number of alternating nonconductive and conductive layers have been achieved.

Embodiments of the present invention include a method for forming a bushing using additive manufacturing, comprising: (a) rotating an object about an axis of revolution using a first rotational stage, (b) applying a photocurable nonconductive liquid formulation sub layer to the object; (c) directing an energy source to provide an energy dose onto the object at a desired rotational location, wherein the energy dose is configured to cure and solidify the sub layer; and repeating (a), (b) and (c) until a desired radial thickness of a cured liquid formulation layer is a achieved, wherein the bushing is a bulk-type bushing.

Embodiments of the present invention include a bushing, comprising: a conductor; and a photocurable nonconductive formulation disposed about the conductor and operative to insulate the conductor.

In a refinement, the bushing is a bulk-type bushing.

In another refinement, the bushing further comprises a conductive layer disposed about the nonconductive layer, wherein the bushing is a condenser bushing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for forming an article of manufacture using additive manufacturing, comprising:
    rotating an object continuously about a horizontal axis using a first rotational stage, wherein the object is partially submerged in a bath of energy curable liquid formulation during the rotation;
    controlling a rate of rotation of the object to achieve a desired radial thickness of a sub layer of uncured liquid formulation at a desired rotational location on the object;
    directing an energy source to provide an energy dose onto the object at a desired rotational location, wherein the energy dose is configured to cure and solidify the sub layer; and
    repeating the rotating, the controlling, and the directing until a desired radial thickness of a cured liquid formulation layer is achieved.

2. The method of claim 1, further comprising forming the article as a bulk-type bushing.

3. The method of claim 1, wherein the cured liquid formulation layer is a nonconductive layer, further comprising forming a conductive layer over at least part of the nonconductive layer.

4. The method of claim 3, further comprising forming the article as a condenser bushing.

5. The method of claim 3, further comprising a transfer mechanism removing the object from the bath after achieving the desired radial thickness of the cured liquid formation; rotating the object about the horizontal axis; and applying the conductive layer over the at least part of the nonconductive layer.

6. The method of claim 3, wherein the conductive layer is added rotationally downstream of the provision of the energy dose during continuous rotation by the first rotational stage.

7. The method of claim 3, further comprising repeating the rotating, the controlling, and the directing until a desired radial thickness of a second nonconductive layer is achieved.

8. The method of claim 7, further comprising repeating the forming, the rotating, the controlling, and the directing until a desired number of alternating nonconductive and conductive layers have been achieved.

9. The method of claim 3, further comprising varying a length along the horizontal axis of selected conductive layers.

10. The method of claim 1, further comprising operating a linear stage to maintain a desired degree of submersion of the object in the bath.

11. The method of claim 1, further comprising varying a length along the horizontal axis to which the energy dose is applied.

12. The method of claim 1, further comprising varying an output of the energy source to achieve a shape of the article that is not a body of revolution.

13. The method of claim 1, further comprising forming an overhang on the article.

14. The method of claim 1, further comprising repeating the rotating, the controlling, and the directing to form a weather shed on the article.

15. A method for forming a bushing using additive manufacturing, comprising:
- rotating an object about an axis of rotation using a first rotational stage, applying a photocurable nonconductive liquid formulation sub layer to the object;
- directing an energy source to provide an energy dose onto the object at a desired rotational location, wherein the energy dose is configured to cure and solidify the sub layer;
- repeating the rotating, the applying, and the directing until a desired radial thickness of a nonconductive cured liquid formulation layer is achieved;
- forming a conductive layer over at least part of the nonconductive cured liquid formulation layer; and
- repeating the rotating, the applying, the directing, and the forming until a desired number of alternating nonconductive and conductive layers have been achieved,
- wherein the bushing is a condenser bushing.

16. The method of claim 15, further comprising varying a length along the axis of rotation of selected conductive layers.

17. The method of claim 15, further comprising varying a length along the axis of rotation along which the energy dose is applied.

18. The method of claim 15, further comprising varying an output of the energy source to achieve a shape of the bushing that is not a body of revolution.

19. The method of claim 1, wherein the method is performed by an apparatus comprising:
- a non-transitory computer readable storage medium readable by a processor and storing program instructions for execution by the processor to perform the method.

20. The method of claim 19, wherein the cured liquid formulation layer is a nonconductive layer, the method further comprising adding a conductive layer over at least part of the nonconductive layer.

21. The method of claim 20, further comprising:
- directing a transfer mechanism to remove the object from the bath after achieving the desired radial thickness of the cured liquid formation;
- rotating the object about the horizontal axis; and
- applying the conductive layer over the at least part of the nonconductive layer.

22. The method of claim 20, further comprising adding the conductive layer rotationally downstream of the provision of the energy dose during the continuous rotation by the first rotational stage.

23. The method of claim 20, further comprising repeating the rotating, the controlling, and the directing until a desired radial thickness of a second nonconductive layer is achieved.

24. The method of claim 23, further comprising repeating the forming, the rotating, the controlling, and the directing until a desired number of alternating nonconductive and conductive layers have been achieved.

25. A method for forming a bushing using additive manufacturing, comprising:
- rotating an object about an axis of rotation using a first rotational stage,
- controlling rotation of the object to apply a photocurable nonconductive liquid formulation sub layer to the object to achieve a desired radial thickness of the sub layer;
- directing an energy source to provide an energy dose onto the object at a desired rotational location, wherein the energy dose is configured to cure and solidify the sub layer; and
- repeat the rotating, the applying, and the directing until a desired radial thickness of a cured liquid formulation layer is achieved,
- wherein the bushing is a bulk-type bushing.

26. The method of claim 1, further comprising forming the article as a bushing:
- wherein the object is a conductor of the bushing; and
- wherein the curable liquid formulation is a photocurable nonconductive formulation that, when cured by the energy dose, is disposed about the conductor and operative to insulate the conductor.

27. The method of claim 26, further comprising a conductive layer about the nonconductive formation.

28. The method of claim 27, wherein the conductive layer comprises a photocurable conductive formulation.

29. The method of claim 27, wherein the nonconductive formulation is disposed in a form of at least one nonconductive layer cylindrically surrounding the conductor.

30. The method of claim 29, further comprising disposing a plurality of alternating nonconductive layers and conductive layers around each other, wherein the bushing is a condenser bushing.

* * * * *